（12) United States Patent
Smet et al.

(10) Patent No.: US 7,791,905 B2
(45) Date of Patent: Sep. 7, 2010

(54) ELECTRICAL DC-DC POWER CONVERTER WITH MAGNETICALLY COUPLED SWITCH CONTROL CIRCUIT

(75) Inventors: Bart Jozef Maria Smet, Eindhoven (NL); Hendrik Jan Zwerver, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 39 days.

(21) Appl. No.: 12/373,911

(22) PCT Filed: Jul. 30, 2007

(86) PCT No.: PCT/IB2007/052997
§ 371 (c)(1),
(2), (4) Date: Jan. 15, 2009

(87) PCT Pub. No.: WO2008/015626
PCT Pub. Date: Feb. 7, 2008

(65) Prior Publication Data
US 2009/0244930 A1 Oct. 1, 2009

(30) Foreign Application Priority Data
Aug. 4, 2006 (EP) .................................. 06118451

(51) Int. Cl.
*H02M 3/335* (2006.01)
(52) U.S. Cl. .............................. 363/18; 363/20; 363/24; 363/30
(58) Field of Classification Search .................. 363/16, 363/18, 19, 20, 24, 30, 133, 139
See application file for complete search history.

(56) References Cited

U.S. PATENT DOCUMENTS

| | | | | |
|---|---|---|---|---|
| 4,394,719 A | * | 7/1983 | Moberg | ........................ 363/18 |
| 4,800,476 A | * | 1/1989 | Harada et al. | .................. 363/16 |
| 5,592,367 A | * | 1/1997 | Sugimori et al. | .............. 363/17 |
| 5,726,875 A | | 3/1998 | Hirabayashi et al. | |
| 5,751,560 A | * | 5/1998 | Yokoyama | .................... 363/18 |
| 6,249,156 B1 | * | 6/2001 | Attwood | ..................... 327/110 |
| 6,275,016 B1 | | 8/2001 | Ivanov | |

FOREIGN PATENT DOCUMENTS

| | | |
|---|---|---|
| EP | 0401931 A1 | 12/1990 |
| FR | 2751805 | 1/1998 |
| FR | 2789818 | 8/2000 |
| WO | 03041250 A1 | 5/2003 |

OTHER PUBLICATIONS

Gert K. Andersen et al; "Current Programmed Control of a Single-Phase Two-Switch Buck-Boost Power Factor Correction Circuit", IEEE Transactions on Industrial Electronics, vol. 53, NL. 1, Feb. 2006, pp. 263-271.

* cited by examiner

*Primary Examiner*—Bao Q Vu
*Assistant Examiner*—Nguyen Tran

(57) ABSTRACT

Power converter with a controllable first switch and a diode and a controllable second switch and a second diode, a transformer with a primary winding and a secondary winding, of which the secondary winding forms at least part of a control circuit for the first switch. As a result of an alternating voltage across the primary winding, a synchronously alternating voltage is induced in the secondary winding, which can be used to control the first switch essentially synchronously with the second switch.

9 Claims, 1 Drawing Sheet

ELECTRICAL DC-DC POWER CONVERTER WITH MAGNETICALLY COUPLED SWITCH CONTROL CIRCUIT

This application is a national stage application under 35 U.S.C. §371 of International Application No. PCT/IB2007/052997 filed on Jul. 30, 2007, and published in the English language on Feb. 7, 2008, as International Publication No. WO/2008/015626, which claims priority to European Application No. 06118451.1, filed on Aug. 4, 2006, incorporated herein by reference.

FIELD OF THE INVENTION

The present invention relates to an electric DC-DC power converter, for preconditioning a fully rectified sinusoidal power signal wherein voltage peaks of the rectified signal may be higher than the desired output voltage.

BACKGROUND OF THE INVENTION

Electric DC-DC power converters are known in the art, and may be used to power a lamp. These converters comprise an input section and an output section, each section comprising at least a switch, for example embodied by a FET or any other suitable power switch. The converter is operated by controlling the switches, which may be performed by digital control circuitry. A difficulty in design and realization of these converters is, that at least one of the switches, usually a switch in the input section, is connected to a high voltage terminal. A control signal for such a switch, which is referred to as a floating switch in the art, should then also have at least a high voltage component, which is difficult to realize by digital control circuitry. It is known in the art to use a level shift IC for operating electronics at relatively high voltages, or to use large transformers. A disadvantage of the use of a level shift IC is that the voltage range for which a level shift IC can be applied is limited, which prohibits use of these components in power converters operating at a few hundred Volts. Large transformers have the disadvantage of being heavy and expensive.

OBJECT OF THE INVENTION

It is an object of the present invention to provide an electric DC-DC power converter comprising a control circuit for a floating switch, overcoming at least one of the above-mentioned disadvantages.

SUMMARY OF THE INVENTION

The invention provides a power converter according to claim 1. The power converter comprises: an input section with a controllable first switch and a diode, an output section comprising a controllable second switch and a second diode, and a transformer with a primary winding and a secondary winding, the secondary winding being at least part of a control circuit for controlling the first switch. The primary winding of the transformer is configured to conduct a current that comprises an essentially constant component that is related to the mean power that is transferred from the input to the output, and an essentially alternating component that is related to switching of the second switch. As a result of the alternating voltage component across the primary winding, a synchronously alternating voltage is induced in the secondary winding, which can be used to control the first switch essentially synchronously with the second switch. Because only very little power is required to control the first switch, the transformer does not need to be dimensioned large or heavy.

In an embodiment of a power converter according to the present invention, the secondary winding of the transformer is directly connected to a control terminal of the first switch, resulting in a topology with very few components.

In another embodiment of a power converter according to the present invention, the secondary winding of the transformer is coupled to a control terminal of the first switch by a capacitor, with the advantage that operating of the first switch is enabled, even when a voltage at the input section is very low, for example about zero.

In yet another embodiment of a power converter according to the present invention, the secondary winding of the transformer is coupled to a control terminal of the first switch by a series connection of a capacitor and a resistance, with the advantage that no disturbing high frequency components in the voltage across the secondary winding are input to the control terminal of the first switch.

In a further embodiment of a power converter according to the present invention, a zener diode is coupled to a control terminal of the first switch, protecting at least the control terminal to damage due to an overvoltage.

In yet a further embodiment of a power converter according to the present invention, a shunt resistance is present across the first switch, facilitating easy start up of the power converter.

In another further embodiment of a power converter according to the present invention, a signal processing circuitry is coupled to a control terminal of the first switch, which provides an optimal switching of the first switch.

In still a further embodiment of a power converter according to the present invention, a control circuit is present for generating a control signal for the second switch.

In again another embodiment of a power converter according to the present invention, a square wave signal is used as a control signal for the second switch, offering the advantage of very precise switching of the first switch.

BRIEF DESCRIPTION OF THE DRAWINGS

Below, the invention is elucidated in more detail with reference to the accompanying drawings, in which.

DETAILED DESCRIPTION OF EXAMPLES

Figure 1:
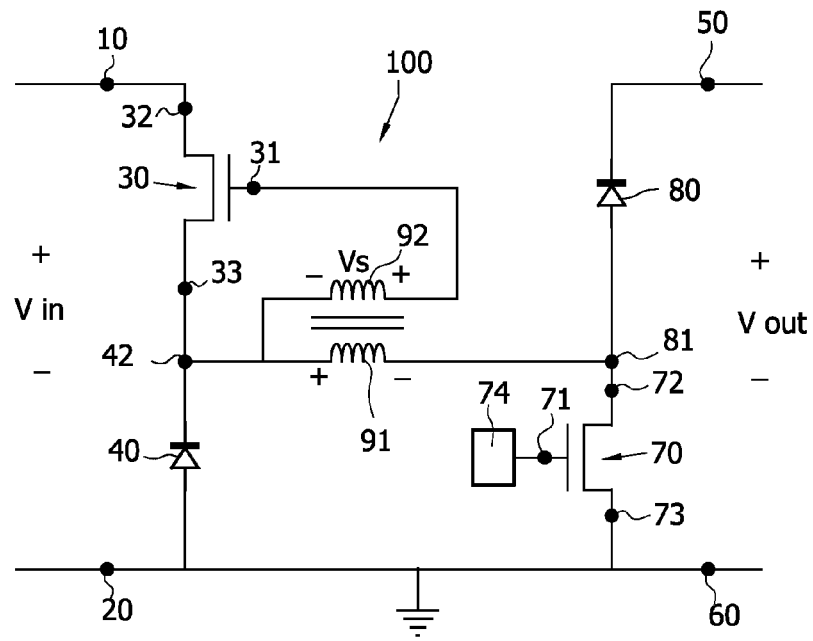
FIG. 1 is a schematic diagram of a first embodiment of a power converter according to the invention.

In the drawings, like reference numbers refer to like components. FIG. 1 shows a schematic diagram of a simplified power converter 100 according to the present invention. The converter 100 comprises a first input terminal 10 and a second input terminal 20, for receiving an input power, which is in general a DC voltage, and in particular a rectified alternating voltage. Between the first input terminal 10 and the second input terminal 20 a series connection of a controllable first switch 30 and a first diode 40 is connected, the first switch 30 and first diode 40 having a common node 42. The first switch 30 has a gate (terminal) 31, and channel terminals 32 and 33. Between a first output terminal 50 and second output terminal 60 a series connection of a controllable second switch 70 and a second diode 80 are connected, the controllable second switch 70 and second diode 80 having a common node 81. A gate (terminal) 71 of the second switch 70 is connected to a control signal generator 74. Between node 42 and node 81 a primary winding 91 of transformer 90 is provided. The secondary winding 92 of transformer 90 is connected between node 42 and gate 31.

In operation, an input voltage $V_{in}$ is present across input terminals 10 and 20, and an output voltage $V_{out}$ is present across the output terminals 50 and 60. The output voltage is kept essentially constant at a desired level, for example by a capacitor or a capacitive load (not shown) connected between the output terminals 50, 60. The control signal generator 74 provides a switching signal to the gate 71 of the second switch 70, which causes a current to flow through the primary winding 91. At an instance when the first switch 30 and the second switch 70 are switched conductive, the voltage $V_{in}$ is present across primary winding 91 and a current flows from the first input terminal 10 through the first switch 30 via the primary winding 91 through the second switch 70 to the second output terminal 60. When the second switch 70 is subsequently switched non-conducting, the second diode 60 will commutate and the current will flow from the primary winding 91 to the first output terminal 50. The voltage over the primary winding 91 will then decrease from $V_{in}$ to $V_{in}-V_{out}$. Herein, it is assumed that $V_{in}-V_{out}$ is always smaller than $V_{in}$, so that repeatedly switching switch 70 on and off leads to a square-wave voltage across the primary winding 91, and because of the magnetic coupling between the primary and secondary transformer windings 91, 92 also to a square-wave voltage $V_s$ across the secondary winding 92, wherein $V_s$ equals the voltage across the primary winding 91 multiplied by the turns ratio between the primary winding 91 and the secondary winding 92. The voltage across the primary winding 91 is a square wave of which the average value is essentially kept zero, by operating switch 70 in order to keep the current through the primary winding at an essentially constant value. A DC component is missing in $V_s$, since transformer 90 can not transform a DC component of a voltage. When the voltage across the primary winding 91 decreases due to the switching of the second switch 70, the voltage $V_s$ induced in the secondary winding 92 also decreases from a high value to a low value. The turns ratio of the transformer 90 is selected such that a low value of $V_s$ is low enough to switch off the first switch 30, and the value of $V_s$ is high enough to switch on the first switch 30.

Figure 2:
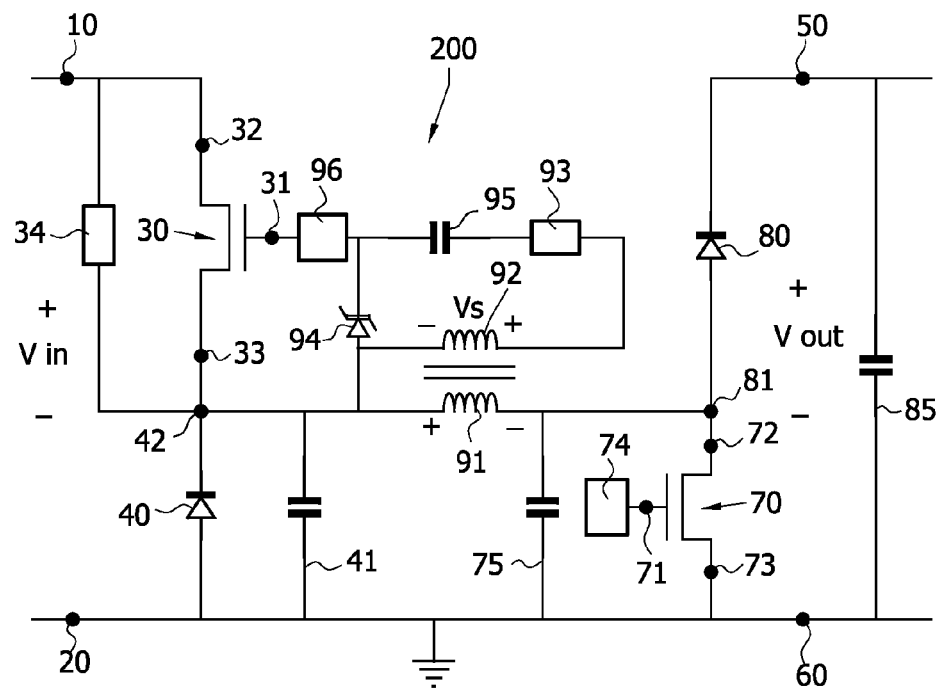
FIG. 2 is a schematic diagram of a second embodiment of a power converter according to the invention.

FIG. 2 shows a diagram of a power converter 200 according to an embodiment of the present invention. The power converter 200 comprises the power converter 100 as illustrated in FIG. 1, supplemented with additional electrical components. In FIG. 2 a first parasitic capacitance 41 and a second parasitic capacitance 75 are shown. It should be noted that these parasitic capacitances may be present as well when realizing a practical embodiment of the power converter 100 as illustrated in FIG. 1. The second parasitic capacitance 75 causes the commutation of the second diode 80 to take place smoothly, while the first parasitic capacitance 41 causes the commutation of the first diode 40 to take place smoothly.

An optional zener diode 94 may be applied to prevent damages to the first switch 30 due to overvoltages, since it limits the voltage between the gate terminal 31 and the source terminal 33 of the first switch 30 to a safe value. Overvoltages may in particular occur when input voltage $V_{in}$ reaches low values, e.g. about 0 Volt. An optional DC blocking capacitor 95 is present to filter any DC component that arises when the input voltage $V_{in}$ drops and becomes smaller than the output voltage $V_{out}$, having the advantage that no disturbing DC components in the voltage $V_s$ across the secondary winding 92 are input to the gate 31 of the first switch 30. The DC blocking capacitor 95 also has the advantage that the voltage between the gate 31 and the channel terminal 33 of the first switch 30 becomes negative and the first switch 30 becomes non-conducting under this condition. A further advantage of the DC blocking capacitor is that it may increase the gate-source voltage of the first switch 20 at a zero-crossing of the input voltage $V_{in}$, thus enabling switching of the first switch 30 at a zero-crossing of the input voltage $V_{in}$.

A resistance 93 may be added to form a filter in conjunction with DC blocking capacitor 95 for suppressing undesired harmonic content of a square wave voltage $V_s$, with the advantage that no disturbing high frequency components in the voltage across the secondary winding 92 are input to the gate 31 of the first switch 30. Furthermore, a signal processing circuit 96 is shown, which is configured to process voltage $V_s$ induced in the secondary winding 92 before it is applied to gate 31 of the first switch 30. The signal processing circuit 96 may for example be configured to delay the square wave voltage at the gate terminal 31 of the first switch 30, with respect to the switching signal at the gate terminal 71 of the second switch 70, provided by the control signal generator 74. In general signal processing circuit 96 may be configured to provide an optimum switching of the first switch 30. The control signal generator 74 may be configured to keep the output voltage $V_{out}$ at a desired value, for example by applying pulse width modulation. A load capacitor 85 may be applied for keeping $V_{out}$ at the desired level. When $V_{out}$ is at a relatively low value, a current flowing through the second diode 80 when switch 70 is not conducting will charge load capacitor 85 until it has reached a desired value, which value can be enforced by e.g. a duty cycle of the second switch 70. When $V_{out}$ is relatively high, no current will be able to flow through the second diode 80, and the load capacitor 85 will be discharged by a load current.

The first switch 30 is furthermore shunted by a shunt resistance 34, which is applied for starting up the power converter 200, i.e. facilitating easy start up of the power converter. When the shunt resistance 34 is omitted, no current path is formed when switch 70 is operated, and additional circuitry is necessary for switching the first switch 30 conductive.

In a practical embodiment the input voltage $V_{in}$ may be between 347 and 480 Volts RMS, the output voltage $V_{out}$ may be 480 Volts. Then the first switch 30 may be a 900 Volt MOSFET. The first diode 40 should be a high voltage diode, but it may also be embodied by a series connection of a plurality of diodes. The second switch 70 and the second diode 80 may be high-voltage components, for example 600 Volt components. An output power of 310 Watt may be achieved, which makes the power converter applicable for powering e.g. a lamp, or even up to 3 lamps. The second switch 70 is operated at a frequency of about 50 kHz to about 250 kHz. The second switch 70 may be a separate component, or it may be integrated in a control IC, which may further comprise the functionality of the control signal generator. In general, besides converter shown in the above examples, the invention may be applied in a variety of power converters, such as e.g. a DC-DC converter for additional power supply applications.

As required, detailed embodiments of the present invention are disclosed herein, and it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the mere fact that certain measures are recited in mutually different dependent claims does not indicate that a combination of these measures cannot be used to advantage.

Further, the terms and phrases used herein are not intended to be limiting; but rather, to provide an understandable description of the invention. The terms "a" or "an", as used herein, are defined as one or more than one. The term another, as used herein, is defined as at least a second or more. The terms including and/or having, as used herein, are defined as comprising (i.e., open language). The term coupled, as used herein, is defined as connected, although not necessarily directly, and not necessarily by means of wires.

The invention claimed is:

1. Electrical power converter, comprising:
   a first input terminal;
   a second input terminal;
   a controllable first switch connected to the first input terminal, the switch comprising a control terminal;
   a first diode, connected between the first switch and the second input terminal;
   a first output terminal;
   a second output terminal;
   a controllable second switch connected to the second output terminal;
   a second diode, connected between the first output terminal and the second switch; and
   a transformer having a primary winding and a secondary winding; the primary winding being connected between a node between the first switch and the first diode and a node between the second switch and the second diode; the secondary winding forming part of a control circuit for controlling the first switch, the secondary winding being coupled to the control terminal of the first switch and configured for generating a control voltage for controlling the first switch.

2. The power converter according to claim 1, wherein the secondary winding is directly connected to the control terminal of the first switch.

3. The power converter according to claim 1, wherein the secondary winding is coupled with the control terminal of the first switch through a capacitor.

4. The power converter according to claim 1, wherein the secondary winding is connected with the control terminal of the first switch through a series connection of one or more capacitors and one or more resistors.

5. The power converter according to claim 1, wherein a zener diode is connected between the control terminal and a channel terminal of the first switch.

6. The power converter according to claim 1, wherein a shunt resistance is connected in parallel with the first switch.

7. The power converter according to claim 1, wherein a signal processing circuitry is provided for processing the control signal for the first switch.

8. The power converter according to claim 1 ms, further comprising a control signal generator for generating a control signal for controlling the second switch.

9. The power converter according to claim 8, wherein the control signal is a square wave signal.

* * * * *